(12) United States Patent
Tabuchi et al.

(10) Patent No.: US 8,809,762 B2
(45) Date of Patent: Aug. 19, 2014

(54) PHOTODETECTOR CIRCUIT

(71) Applicant: Semiconductor Components Industries, LLC, Phoenix, AZ (US)

(72) Inventors: Yoshihisa Tabuchi, Gifu-ken (JP); Yasunori Nagata, Gifu-ken (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 104 days.

(21) Appl. No.: 13/714,149

(22) Filed: Dec. 13, 2012

(65) Prior Publication Data

US 2013/0256507 A1    Oct. 3, 2013

(30) Foreign Application Priority Data

Dec. 13, 2011    (JP) ................. 2011-272018

(51) Int. Cl.
*H01J 40/14*    (2006.01)
*G01J 1/18*    (2006.01)
*G01J 1/44*    (2006.01)

(52) U.S. Cl.
CPC ..... *G01J 1/44* (2013.01); *G01J 1/18* (2013.01)
USPC .................................................... 250/214 R

(58) Field of Classification Search
CPC .......................................................... G01J 1/18
USPC .................................................... 250/214 R
See application file for complete search history.

(56) References Cited

U.S. PATENT DOCUMENTS

| | | | | |
|---|---|---|---|---|
| 4,937,441 A | * | 6/1990 | Ishizawa et al. | 250/205 |
| 6,731,871 B2 | * | 5/2004 | Kitani et al. | 396/301 |
| 2009/0128229 A1 | | 5/2009 | Watanabe et al. | |
| 2009/0153679 A1 | | 6/2009 | Nagata et al. | |
| 2009/0160958 A1 | | 6/2009 | Yamada et al. | |
| 2012/0154614 A1 | | 6/2012 | Moriya et al. | |

FOREIGN PATENT DOCUMENTS

| | | |
|---|---|---|
| JP | 2006-227274 A | 8/2006 |
| JP | 2009128400 A | 6/2009 |
| JP | 2009-145634 A | 7/2009 |
| JP | 2009-151203 A | 7/2009 |
| JP | 2009-156947 A | 7/2009 |
| JP | 2010-032965 A | 2/2010 |
| JP | 2011-065140 A | 3/2011 |

OTHER PUBLICATIONS esp@cenet Patent Abstract for Japanese Publication No. 2009-128400, publication date Jun. 11, 2009. (1 page).
esp@cenet Patent Abstract for Japanese Publication No. 2009-156947, publication date Jul. 16, 2009. (1 page).
esp@cenet Patent Abstract for Japanese Publication No. 2006-227274, publication date Aug. 31, 2006. (1 page).
esp@cenet Patent Abstract for Japanese Publication No. 2009-145634, publication date Jul. 2, 2009. (1 page).
esp@cenet Patent Abstract for Japanese Publication No. 2009-151203, publication date Jul. 9, 2009. (2 pages).

(Continued)

*Primary Examiner* — Thanh Luu
(74) *Attorney, Agent, or Firm* — Robert F. Hightower

(57) ABSTRACT

Light from a photodiode is detected using a phototransistor. At the time of startup, set data concerning a detected current is received at a communication interface, and the received set data is compared with the detected current. A control unit adjusts a current of the phototransistor so that the detected current matches the set data.

3 Claims, 5 Drawing Sheets

(56) References Cited

OTHER PUBLICATIONS esp@cenet Patent Abstract for Japanese Publication No. 2010-032965, publication date Feb. 12, 2010. (1 page).

esp@cenet Patent Abstract for Japanese Publication No. 2011-065140, publication date Mar. 31, 2011. (1 page).

\* cited by examiner

PHOTODETECTOR CIRCUIT

TECHNICAL FIELD

The present invention relates to a photodetector circuit for detecting light from a photodiode using a phototransistor.

BACKGROUND ART

Conventionally, various cameras are provided with a vibration compensation function. The vibration compensation is achieved by moving the lens in accordance with camera movement to thereby obtain an image in which vibrations are compensated for. In order to execute this vibration compensation, the lens must be driven appropriately, and this requires accurate detection of the lens position.

For detecting positions of various components, there has been provided an arrangement in which a magnet is mounted on the target component and a Hall element for detecting this magnet is used. A Hall element is also being used for detecting a lens position.

CITATION LIST

Patent Literature

[Patent Literature 1] JP 2009-128400 A
[Patent Literature 2] JP 2009-156947 A
[Patent Literature 3] JP 2006-227274 A

SUMMARY OF INVENTION

Technical Problem

However, a Hall element is relatively costly. Moreover, for applications such as cameras in cell phones and smartphones where space reduction is required, or special device shapes are desired by users, it may not be possible to sufficiently satisfy such requirements or desires when a Hall element is used. It is therefore necessary to consider alternative detection methods. For example, one alternative detection method may be an optical detection method, in which a photodetector such as a photo-reflector or a photo-interrupter may be used. A photo-reflector is a device in which light emitted from a photodiode is reflected off a target and the reflected light is detected using a phototransistor. By configuring such that the received light amount at the phototransistor varies depending on lens position, the position of the lens can be detected.

In such a photo-reflector, since outputs are influenced by factors such as element deterioration over time, changes in the power supply voltage, and temperature changes, corrections addressing those influences are desired.

Solution to Problem

The present invention provides a photodetector circuit for detecting light from a photodiode using a phototransistor. The photodetector circuit comprises: a communication unit that receives, at the time of startup, set data concerning a detected current; a comparison unit for comparing the set data received by the communication unit with the detected current; and an adjustment unit for adjusting a current of the phototransistor so that the detected current matches the set data. The photodetector circuit performs control at the time of startup so that the current that flows through the phototransistor matches the set data.

Advantageous Effects of Invention

According to the present invention, the current that flows through the phototransistor can be adjusted at the time of startup, and it is thereby possible to address factors such as element deterioration.

DESCRIPTION OF EMBODIMENTS

The embodiments of the present invention will be described below with reference to the attached drawings.

Figure 1:
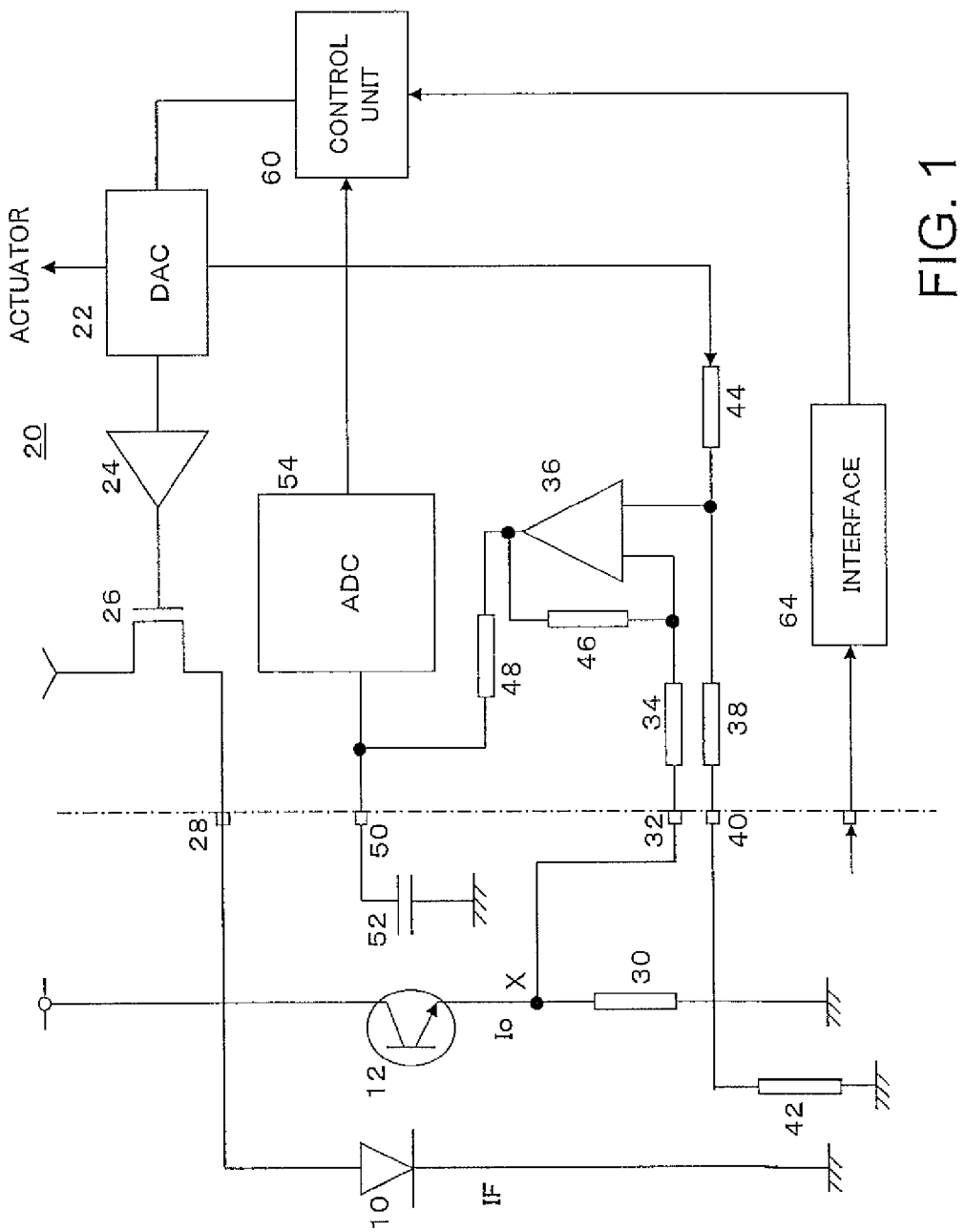
FIG. 1 is a diagram showing a configuration of a photodetector circuit according to an embodiment of the present invention.

FIG. 1 is a diagram showing a configuration of a photodetector circuit according to an embodiment of the present invention. A photo-reflector serving as a photodetector includes a photodiode 10 and a phototransistor 12, which are provided external to a semiconductor integrated circuit 20. When light emitted from the photodiode 10 is reflected off a detection target and the reflected light is introduced into the phototransistor 12, a current according to the incident light amount flows through the phototransistor 12. Even while the amount of emitted light from the photodiode 10 remains constant, when the detection target is moved in accordance with the lens position, the received light amount at the phototransistor 12 varies. By detecting the amount of current through the phototransistor 12, the lens position is detected. Since the lens position should be detected along two directions of x and y, two photo-reflectors are provided to detect the lens position in both the x and y directions. A reflector plate or the like attached to the lens serves as the detection target.

In the semiconductor integrated circuit 20, based on input data concerning a constant current to be caused to flow through the photodiode 10, a DAC 22 outputs a corresponding constant voltage. The output from the DAC 22 is stabilized by an amplifier 24 and subsequently supplied to the gate of an n-channel output transistor 26. The drain of the output transistor 26 is connected to a power supply, while the source of the output transistor 26 is connected via a terminal 28 to the anode of the externally-provided photodiode 10. The cathode of the photodiode 10 is grounded. Accordingly, a constant current IF in accordance with the data input to the DAC 22 is supplied from the power supply to the photodiode 10 via the output transistor 26. It may be preferable to provide a means for controlling the constant current IF, which may include a structure that detects a current flowing through the output transistor 26 and provides a feedback control to the data input to the DAC 22.

The collector of the phototransistor 12 is connected to a power supply, while the emitter of the phototransistor is grounded via a current detecting resistor 30. Accordingly, as described above, a current in accordance with the light amount received at the phototransistor 12 flows through the phototransistor 12 and the current detecting resistor 30. Further, a detection voltage ("point-X voltage") in accordance with the current flowing through the phototransistor 12 is obtained at point X (i.e., point of connection between the phototransistor 12 and the current detecting resistor 30) located above the current detecting resistor 30.

The point-X voltage is introduced into the semiconductor integrated circuit 20 via a terminal 32, and input to the negative input terminal of an operational amplifier 36 via a resistor 34. The positive input terminal of the operational amplifier 36 is connected via a resistor 38, a terminal 40, and an external resistor 42, to ground outside the semiconductor integrated circuit 20. Further, the positive input terminal of the operational amplifier 36 is also connected to one end of a resistor 44. To the other end of this resistor 44, the DAC 22 supplies a reference voltage indicative of the phototransistor 12 current obtained when the lens is located at a reference position. As such, the voltage at the positive input terminal of the operational amplifier 36 is equal to a voltage ("set voltage") obtained by dividing the reference voltage by the resistor 44 and a sum of the resistor 38 and the external resistor 42. The reference voltage is set according to a reference voltage data supplied to the DAC 22. The set voltage at the positive input terminal of the operational amplifier 36 can be adjusted by changing the reference voltage data input to the DAC 22 or by changing the resistance value of the external resistor 42.

The output terminal of the operational amplifier 36 is connected as feedback to its negative input terminal via a resistor 46. Accordingly, the voltage at the output terminal of the operational amplifier 36 is equal to a voltage obtained by amplifying a voltage difference between the positive and negative input terminals in accordance with the resistance values of the resistors 34 and 46.

Further, the output terminal of the operational amplifier 36 is also connected via a resistor 48 and a terminal 50 to a capacitor 52, which has its other end connected to ground outside the semiconductor integrated circuit 20. With this arrangement, a voltage signal obtained by integrating (subjecting to low-pass filtering) the output from the operational amplifier 36 is obtained at the terminal 50. This voltage signal of the terminal 50 is input to the ADC 54. In other words, the ADC 54 receives input of a voltage corresponding to a difference between the detection voltage, which corresponds to the amount of current that flows in the phototransistor 12 in accordance with the received light amount, and the set voltage. Therefore, in an output from the ADC 54, data in accordance with the lens position can be obtained.

The output from the ADC 54 is supplied to a control unit 60, and the lens position is identified in the control unit 60. The control unit 60 performs various controls in accordance with the obtained lens position, such as control of a lens driving actuator. The actuator may be controlled by, for example, driving an H-Bridge driver with a PWM pulse.

According to the configuration of the present embodiment, the current Io of the phototransistor 12 is converted into a voltage and compared with the set voltage, and the comparison result is used to detect the lens position. Although a conversion is made, the detection of the lens position is in fact made on the basis of the current Io.

Various control data and the like are transmitted to the semiconductor integrated circuit 20 from an external microcomputer. The semiconductor integrated circuit 20 includes therein a communication interface 62, and receives at this communication interface 62 the control data transmitted from outside. The received control data are supplied to the control unit 60.

According to the present embodiment, at the time of startup, in order to change the constant current (current IF) supplied from the power supply via the output transistor 26 to the photodiode 10, data in the DAC 22 is changed. By making this change, startup adjustment is performed so that the current Io that flows through the phototransistor 12 conforms to a set value (a value corresponding to a set voltage). The startup adjustment can be carried out according to two processes, and either one of the processes can be selected by settings designated from outside. Preferably, this selection is also set data transmitted from the microcomputer.

Figure 2:
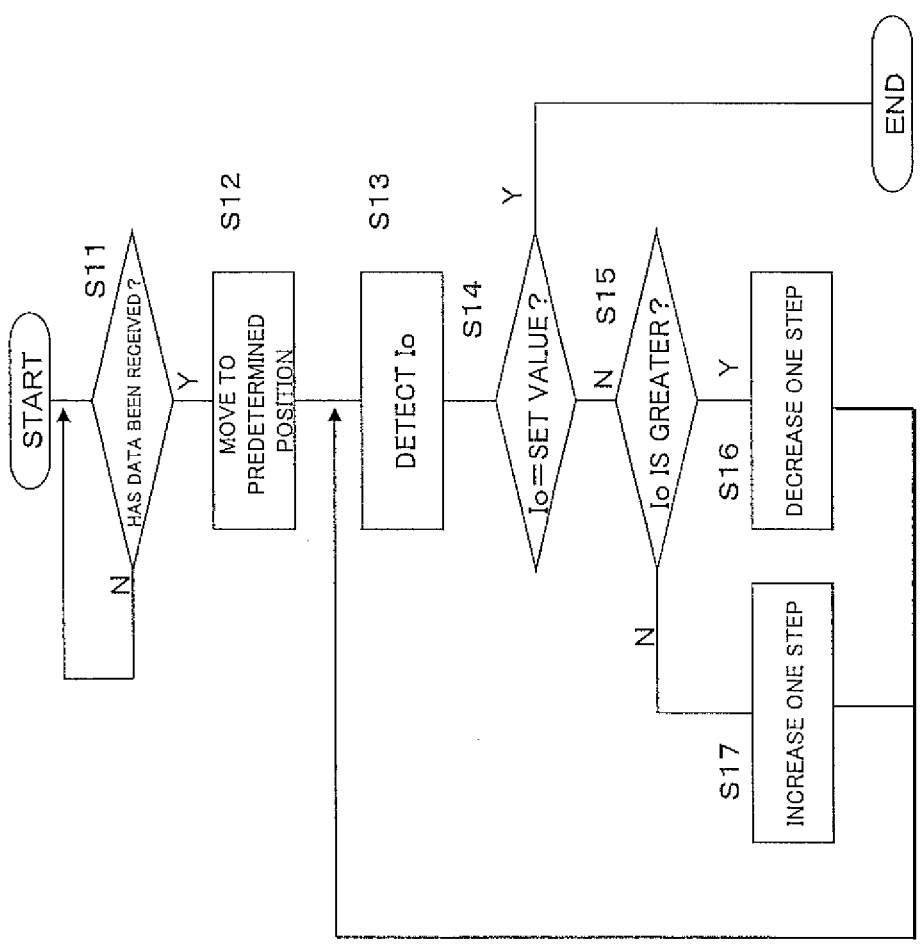
FIG. 2 is a flowchart showing one example of a current correction process.

FIG. 2 shows one example process. At the time of startup, first, a determination is made as to whether control data concerning the set current has been received (S11). If the control data has been received, the actuator is driven to move the lens to a predetermined position (S12). Concerning this predetermined position too, it is desirable to transmit set data from the microcomputer by communication. Further, this predetermined position preferably corresponds to the initial position of the lens. For example, an initial program may be set to cause the lens to move, upon startup, to the infinity position or the midpoint of the moving range, and a bias current value obtained at that initial lens position may be set as the reference voltage to be supplied to the resistor 44.

When a movement to the predetermined position is made, the phototransistor current Io at that point is detected (S13), and a determination is made as to whether the detected Io equals the set value (S14). This determination is desirably made by judging whether or not the detected Io is within a predetermined range from the set value.

When the determination result in S14 is NO, it is determined whether the Io is greater than the set value (S15). When the Io is greater, the reference value of the current IF is decreased by one preset step value (S16), and when the Io is less than the set value, the reference value of the current IF is increased by one preset step value (S17). The process then returns to S13. Further, when the determination result in S14 becomes YES, the process is ended.

As described above, in the process of FIG. 2, the initial setting of the value of the phototransistor 12 current is performed by successively changing the current IF in units of a preset step value.

Figure 3:
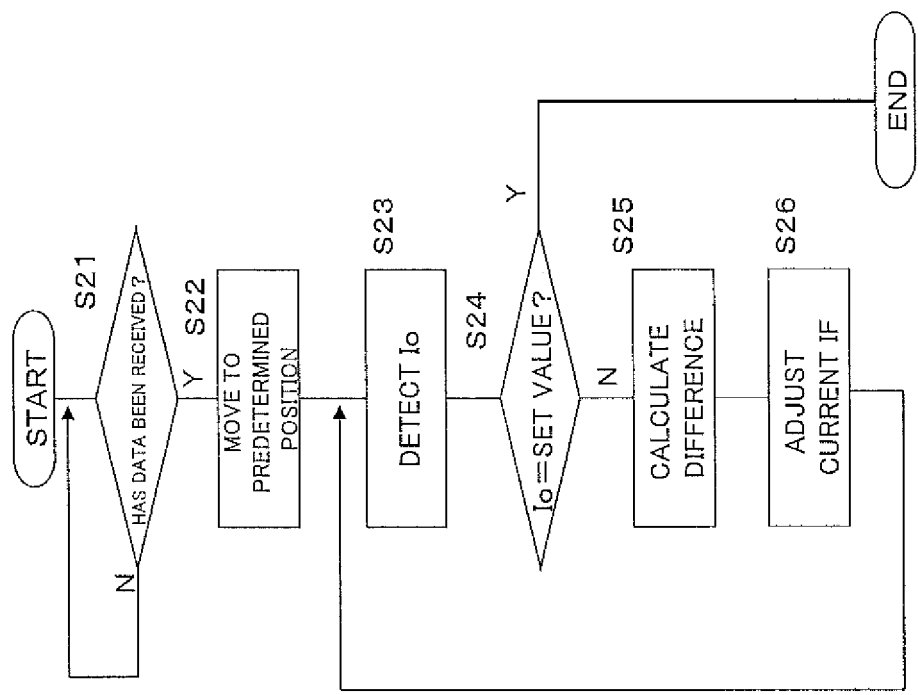
FIG. 3 is a flowchart showing another example of a current correction process.

FIG. 3 shows another example process. As in the above-described example, at the time of startup, if the control data has been received (YES in S21), the lens is moved to the predetermined position (S22), and the current Io is detected (S23). Then, a determination is made as to whether the detected Io equals the set value (S24).

When the determination result in S14 is NO, the difference between the Io and the set value is calculated (S25). An adjustment value is set based on the calculated difference, which may be ½ of the difference, for example. This adjustment value is used to adjust the current IF (S26). As in the above-described example, this adjustment of the bias current is performed by changing the data of the DAC 22 to change the reference value to be output to the output transistor 26. The process then returns to S23. When the determination result in S24 becomes YES, the process is ended.

Figure 4:
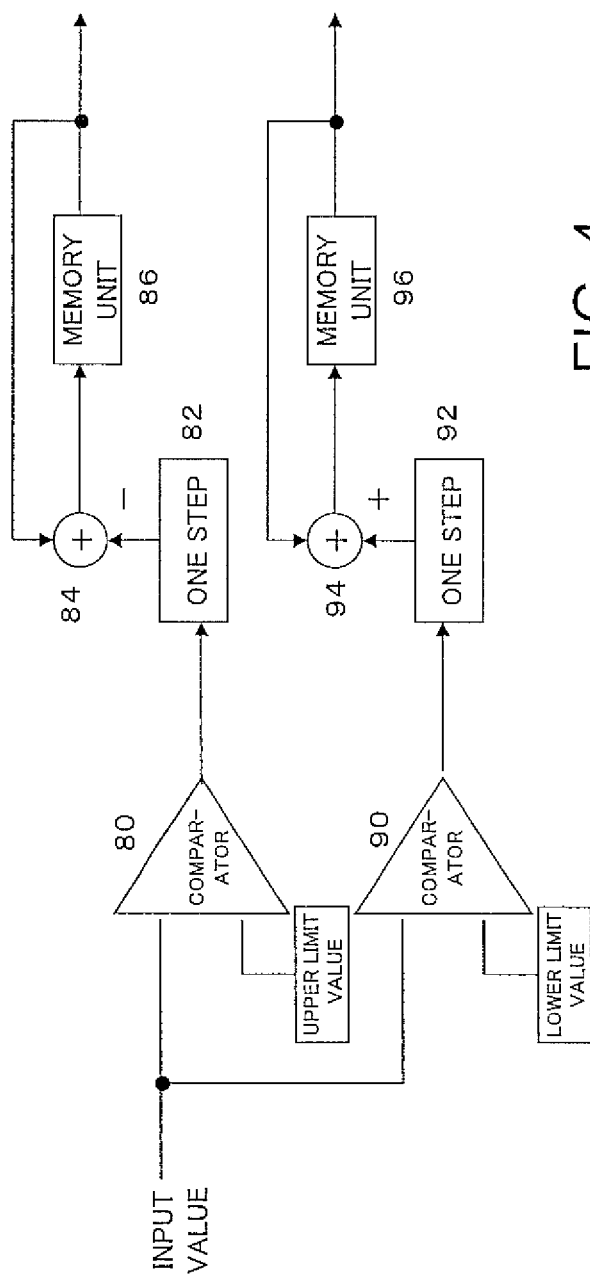
FIG. 4 is a diagram showing a hardware configuration corresponding to FIG. 2.

FIG. 4 illustrates a case in which means for executing the process of FIG. 2 in the control unit 60 is configured with hardware. Data concerning the lens position at the time of startup is stored in memory units 86, 96. In that state, the position of the lens is detected at a predetermined time, and the detected value is input to comparators 80, 90 so as to be compared with an upper limit value and a lower limit value, respectively. When the comparison results indicate that the input position value is greater than the upper limit value, output from the comparator 80 becomes active. As a result, preset data corresponding to one step value stored in the memory unit 82 is supplied to an adder 84. This adder 84 is supplied in advance with data stored in the memory unit 86, so that when the data corresponding to one step value is additionally supplied from the memory unit 82, added data is stored into the memory unit 86, thereby updating the stored content of the memory unit 86. Based on the updated data stored in the memory unit 86, the current IF to be supplied to the photodiode 10 is controlled. At a subsequent time, the present process hardware receives input of data of the lens position detected according to an amount of emitted light corresponding to the current IF increased by one step value. When the detected lens position value becomes within the range between the upper and lower limit values, the process is ended.

On the other hand, when the above-noted comparison results indicate that the input position value is less than the lower limit value, output from the comparator 90 becomes active. Consequently, in a manner corresponding to the above, the stored value in the memory unit 96 is decreased in units of one step value. When the input value becomes within the range between the upper and lower limit values, the process is ended.

Which one of the outputs from the memory units 86, 96 is to be employed may be determined based on the comparison results from the comparators 80, 90.

Figure 5:
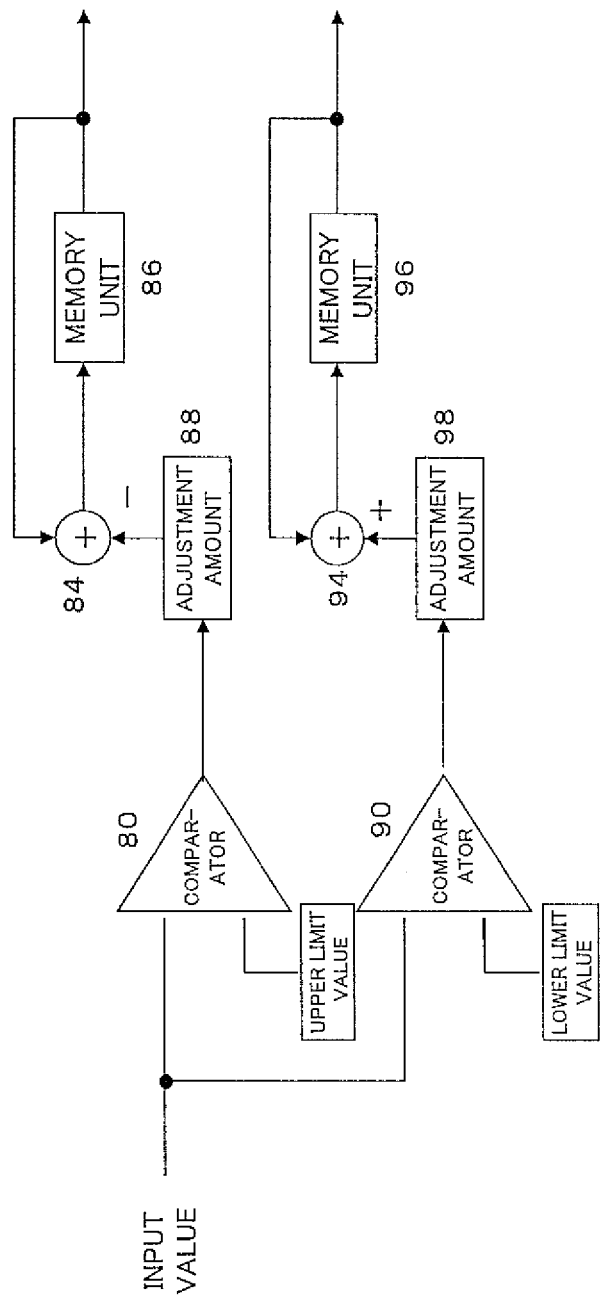
FIG. 5 is a diagram showing a hardware configuration corresponding to FIG. 3.

FIG. 5 illustrates a case in which means for executing the process of FIG. 3 in the control unit 60 is configured with hardware. In this case, adjustment units 88, 98 are provided in place of the memory units 82, 92. Each of the adjustment units 88, 98 receives a difference signal according to the comparison result from the comparator 80 or 90, and changes its outputting adjustment value in accordance with the received difference. As such, a process as shown in FIG. 3 can be executed.

REFERENCE SIGNS LIST

10 photodiode; 12 phototransistor; 20 semiconductor integrated circuit; 24 amplifier; 26 output transistor; 28, 32, 40, 50, terminal; 30 current detecting resistor; 34, 38, 42, 44, 46, 48 resistor; 36 operational amplifier; 52 capacitor; 60 control unit; 70 communication interface; 80, 90 comparator; 82, 92, 86, 96 memory unit; 84, 94 adder; 88, 98 adjustment unit.

The invention claimed is:

1. A photodetector circuit for detecting light from a photodiode using a phototransistor, comprising:
    a communication circuit that receives, at a time of startup, set data concerning a detected current; and
    a control unit that compares the set data received by the communication circuit with the detected current, and adjusts a current of the phototransistor so that the detected current matches the set data,
    wherein the control unit performs control at the time of startup so that the current that flows through the phototransistor matches the set data.

2. The photodetector circuit according to claim 1, wherein, when the set data and the detected current differ from each other, the control unit repeatedly changes the current that flows through the phototransistor by a preset step value, and thereby adjusts the current of the phototransistor so that the detected current matches the set data.

3. The photodetector circuit according to claim 1, wherein, when the set data and the detected current differ from each other, the control unit changes the current that flows through the phototransistor based on a difference between the set data and the detected current, and thereby adjusts the current of the phototransistor so that the detected current matches the set data.

* * * * *